US009722438B2

(12) United States Patent
Degen (10) Patent No.: US 9,722,438 B2
(45) Date of Patent: Aug. 1, 2017

(54) INTEGRATED POWER OUTPUT SERVICE DISCONNECT

(71) Applicant: Yazaki North America, Inc., Canton, MI (US)

(72) Inventor: Jason R. Degen, Plymouth, MI (US)

(73) Assignee: Yazaki North America, Inc., Canton, MI (US)

( * ) Notice: Subject to any disclaimer, the term of this patent is extended or adjusted under 35 U.S.C. 154(b) by 120 days.

(21) Appl. No.: 14/600,965

(22) Filed: Jan. 20, 2015

(65) Prior Publication Data

US 2015/0229080 A1 Aug. 13, 2015

Related U.S. Application Data

(60) Provisional application No. 61/937,658, filed on Feb. 10, 2014.

(51) Int. Cl.
*B60L 11/18* (2006.01)
*H02J 7/00* (2006.01)
(Continued)

(52) U.S. Cl.
CPC ............ *H02J 7/0036* (2013.01); *B60L 11/18* (2013.01); *B60L 11/1818* (2013.01);
(Continued)

(58) Field of Classification Search
CPC . B06L 11/1816; B06L 11/1818; H02J 7/0031; H02J 7/0032; H02J 7/0036
See application file for complete search history.

(56) References Cited

U.S. PATENT DOCUMENTS 5,277,608 A 1/1994 Oda
7,641,499 B1 1/2010 George et al.
(Continued)

FOREIGN PATENT DOCUMENTS

JP 1-132076 9/1989
JP 2015159110 A 9/2015

OTHER PUBLICATIONS

Extended European Search Report issued on Jul. 22, 2015 in European Patent Application No. 15154273.5.
(Continued)

*Primary Examiner* — Kristal Feggins
*Assistant Examiner* — Kendrick Liu
(74) *Attorney, Agent, or Firm* — Harness, Dickey & Pierce, P.L.C.

(57) ABSTRACT

The present teachings provide for an electrical connector including a first housing, power terminals, and first and second shunts. The terminals and shunts are located within a cavity of defined by the first housing. The first housing is configured to mate with a second housing to transfer power between a power storage device and components of an electric or hybrid electric vehicle. The first shunt is configured to complete an interlock circuit. The second shunt is configured to complete a service disconnect circuit. The interlock circuit prevents the transfer of power between the first and second housings when the circuit is broken and allows it when complete. The service disconnect circuit causes the power storage device to be substantially electrically isolated from the rest of the vehicle when the circuit is broken.

19 Claims, 7 Drawing Sheets

(51) Int. Cl.
*H01R 13/707* (2006.01)
*H01R 24/22* (2011.01)
*H01R 13/52* (2006.01)
*H01R 13/703* (2006.01)
*H01R 13/629* (2006.01)

(52) U.S. Cl.
CPC ....... *H01R 13/707* (2013.01); *H01R 13/7032* (2013.01); *H01R 24/22* (2013.01); *H02J 7/0032* (2013.01); *H01R 13/5205* (2013.01); *H01R 13/5221* (2013.01); *H01R 13/62938* (2013.01); *H01R 13/62955* (2013.01)

(56) References Cited

U.S. PATENT DOCUMENTS

| | | | |
|---|---|---|---|
| 7,789,690 B1 | 9/2010 | Rhein | |
| 8,083,533 B2 | 12/2011 | De Chazal | |
| 2008/0233784 A1 | 9/2008 | Patterson et al. | |
| 2011/0260684 A1* | 10/2011 | Xiaofeng | A61K 31/661 320/109 |
| 2014/0091764 A1* | 4/2014 | Kinomura | B60L 11/1818 320/109 |

OTHER PUBLICATIONS

First Official Action in Japanese Patent Application No. JP2015023349 issued on Jan. 26, 2016. Translation provided by Harakenzo.

\* cited by examiner

INTEGRATED POWER OUTPUT SERVICE DISCONNECT

CROSS-REFERENCE TO RELATED APPLICATIONS

This application claims the benefit of U.S. Provisional Application No. 61/937,658, filed on Feb. 10, 2014. The entire disclosure of the above application is incorporated herein by reference.

FIELD

The present disclosure relates to integrated power output service disconnects.

BACKGROUND

This section provides background information related to the present disclosure which is not necessarily prior art.

Hybrid electric vehicle, or electric vehicle ("HEV/EV") battery packs traditionally include independently sealed interfaces bolted to the outer surface of the pack to provide a sealed electrical connection to the pack. These interfaces can generally include high voltage ("HV") connections, providing A/C or D/C power, low voltage ("LV") connections, and service disconnect connections to isolate the pack from the rest of the vehicle so the vehicle may be serviced. The LV connections generally can include high voltage interlock loop ("HVIL") circuits to shut off power to the HV connections. Utilizing multiple, independently housed and sealed HV connections and service disconnects requires a considerable amount of packing space, components, and physical connections. Each independent HV connector traditionally also requires a method to break an LV HVIL circuit prior to disengagement of the HV connector, which further increases the required space, components, and connections.

SUMMARY

This section provides a general summary of the disclosure, and is not a comprehensive disclosure of its full scope or all of its features.

The present teachings provide for an electrical connector including a first housing, a pair of first terminals, a pair of third terminals, a first shunt, and a second shunt. The first housing having a first body defining a cavity. The first housing is configured to mate with a second housing coupled to a power storage device. The first terminals are disposed within the cavity and configured to mate with a pair of second terminals disposed within the second housing to transfer power between the power storage device and the first terminals. The third terminals are disposed within the cavity and configured to mate with a pair of fourth terminals disposed within the second housing to transfer power between the power storage device and the third terminals. The first shunt is disposed within the first housing and is configured to short a pair of fifth terminals disposed within the second housing to complete an interlock circuit. The interlock circuit prevents the transfer of power between the first and second terminals and between the third and fourth terminals when the first shunt is disconnected from the fifth terminals, while allowing transfer of power when the first shunt mates with the fifth terminals. The second shunt is disposed within the first housing and is configured to short a pair of sixth terminals disposed within the second housing to complete a service disconnect circuit. The service disconnect circuit causes the power storage device to be substantially electrically isolated when the second shunt is disconnected from the sixth terminals.

The present teachings further provide for an electrical connector including a first housing, a pair of first terminals, a pair of third terminals, a first shunt, a second shunt, and a lever. The first housing having a first body defining a cavity. The first housing is configured to mate with a second housing coupled to a power storage device. The first terminals are disposed within the cavity and configured to mate with a pair of second terminals disposed within the second housing to transfer power between the power storage device and the first terminals. The third terminals is disposed within the cavity and configured to mate with a pair of fourth terminals disposed within the second housing to transfer power between the power storage device and the third terminals. The first shunt is disposed within the first housing and is configured to short a pair of fifth terminals disposed within the second housing to complete an interlock circuit. The interlock circuit prevents the transfer of power between the first and second terminals and between the third and fourth terminals when the first shunt is disconnected from the fifth terminals, while allowing transfer of power when the first shunt mates with the fifth terminals. The second shunt is disposed within the first housing and is configured to short a pair of sixth terminals disposed within the second housing to complete a service disconnect circuit. The service disconnect circuit causes the power storage device to be substantially electrically isolated when the second shunt is disconnected from the sixth terminals. The lever having a lever body rotatably coupled to the first housing and an arm coupled to the lever body. The lever body includes a cam surface configured to engage a follower member on the second housing. The arm is configured to articulate the cam surface to move the first housing relative to the second housing. The lever moves the first housing between first, second, and third positions relative to the second housing. In the first position, the first and second terminals are mated and neither of the first and second shunts is mated. In the second position, the first and second terminals are mated, the second shunt is mated but the first shunt is not mated. In the third position, the first and second terminals are mated and both the first and second shunts are mated.

The present teachings further provide for an electrical connector including a first housing, a second housing, first through sixth terminals, first and second shunts, and a lever. The first housing has a first body defining a cavity. The second housing has a second body defining a follower member. The second housing is configured to mate with the first housing and to also be coupled to a power storage device. The first and second terminals are disposed within the cavity. The third and fourth terminals are disposed within the second housing. The third terminal is configured to mate with the first terminals to transfer power between the power storage device and the first terminals. The fourth terminal is configured to mate with the second terminals to transfer power between the power storage device and the second terminals. The fifth terminals is disposed within the second housing and connected to an interlock circuit. The first shunt is disposed within the cavity and configured to short the fifth terminals to complete the interlock circuit. The interlock circuit prevents the transfer of power between the first and second terminals and between the third and fourth terminals when the first shunt is disconnected from the fifth terminals, while allowing transfer of power when the first shunt mates with the fifth terminals. The sixth terminals is disposed within the second housing and connected to a service disconnect circuit. The second shunt is disposed within the cavity and configured to short the sixth terminals to complete the service disconnect circuit. The service disconnect circuit causes the power storage device to be electrically isolated when the second shunt is disconnected from the sixth terminals. The lever has a lever body rotatably coupled to the first housing and an arm coupled to the lever body. The lever body includes a cam surface configured to engage the follower member on the second housing. The arm is configured to articulate the cam surface to move the first housing relative to the second housing. The lever moves the first housing between first, second, and third positions relative to the second housing. In the first position the first and second terminals are mated and neither of the first and second shunts is mated. In the second position the first and second terminals, the second shunt, and not the first shunt are mated. In the third position the first and second terminals and both the first and second shunts are mated.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

The present teachings are directed to an electrical connector of the type that can be used, for example, in electric or hybrid-electric vehicles ("EV/HEV"). Specifically, the connector can connect to a power storage unit, such as a battery pack, or capacitor/super capacitor pack for example, for supplying power to the vehicle and/or recharging the power storage unit. The electrical connector can allow for multiple connections to be made within one connector, including one or more power connections, a service disconnect for isolating the storage unit from the rest of the vehicle to allow service of the vehicle, and a single high voltage interlock loop ("HVIL") connection. By incorporating the connections within a single connector, the number of physical connections is reduced as individual HVIL circuits for each power connection are no longer needed. Furthermore, when servicing the vehicle, the number of physical operations needed to isolate the storage unit and disconnect the various connections is reduced.

Figure 1:
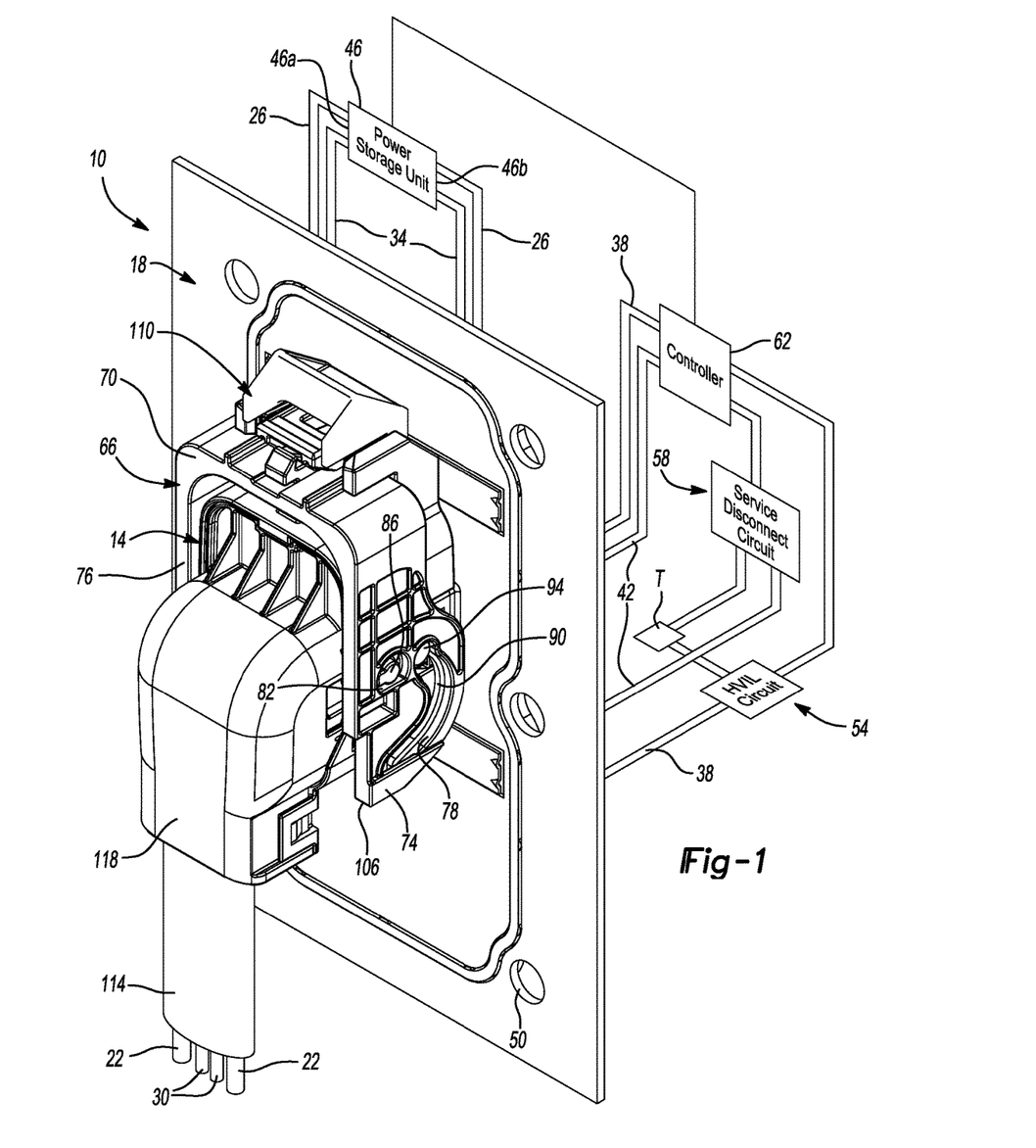
FIG. 1 is a perspective view of a connector with a first and second housing in a fully mated condition in accordance with the present teachings.

With reference to FIG. 1, a connector 10 constructed in accordance with the teachings of the present disclosure is illustrated. The connector 10 can have a first housing 14, second housing 18 that is mate-able to the first housing 14, a pair of first wires 22, which extend from the first housing 14, and a pair of second wires 26 that extend from the second housing 18. The first and second housings 14 and 18 are illustrated in a fully mated condition. The connector 10 can include additional wires that can extend from one or both of the first and second housings 14, 18, such as a grounding wire for example. In the example provided, the connector 10 includes a pair of third wires 30 extending from the first housing 14 and pairs of fourth, fifth, and sixth wires 34, 38, 42 extending from the second housing 18.

A plurality of mounting holes 50 can be formed in the second housing 18 and can receive fasteners (not shown) therethrough to fixedly couple the second housing 18 to a power storage unit 46. The storage unit 46 can include any means for storing DC electric power, such as a battery, a capacitor and/or a supercapacitor for example, and may also include additional components for the operation of the storage unit 46, such as transformers or inverters to allow for multiple different output types of power for example. The second wires 26 can be electrically coupled to opposite terminals 46a and 46b on the storage unit 46 and can be employed to transfer power between the storage unit 46 and the first wires 22 when the first and second housings 14 and 18 are in the fully mated condition. The fourth wires 34 can be coupled to the opposite terminals 46a and 46b of the storage unit 46 and can be employed to transfer power between the storage unit 46 and the third wires 30 when the first and second housings 14 and 18 are in the fully mated condition. It is appreciated that the first, second, third, and/or fourth wires 22, 26, 30, 34 may also be employed to transfer power between other vehicle systems, such as between an alternator or a regenerative braking system and the storage unit 46, to recharge the storage unit 46 for example. The fifth wires 38 can form a portion of an HVIL circuit 54. The sixth wires 42 can form a portion of a service disconnect circuit 58.

The HVIL circuit 54 is configured to receive low voltage power from a low voltage power source, such as a transformer T for example. The HVIL circuit 54 can provide an HVIL input to a controller 62. The HVIL input can be a first signal, such as a relatively high signal voltage, when the HVIL circuit 54 is interrupted, not complete or open, and can be a second signal, such as a relatively low voltage signal, when the HVIL circuit 54 is completed or closed. The controller 62 can be electrically coupled to the power storage unit and configured to control current flow within the second wires 26 and within the fourth wires 34 based on the HVIL input (i.e., whether the HVIL circuit 54 is opened or closed). When the HVIL input provided by the HVIL circuit 54 corresponds to the first signal, the controller 62 controls the storage unit 46 so that electrical power is transmitted between the storage unit 46 and the second wires 26 and between the storage unit 46 and the fourth wires 34. When the HVIL input provided by the HVIL circuit 54 corresponds to the second signal, the controller 62 inhibits current flow between the storage unit 46 and the second wires 26 and between the storage unit 46 and the fourth wires 34.

The service disconnect circuit 58 is configured to receive low voltage power from the low voltage power source T, or a second low voltage power source (not shown). The service disconnect circuit 58 can be electrically coupled to the controller 62. While the same controller is described in the present example, it is understood that separate controllers or control units could be used for operating the HVIL circuit 54 and the service disconnect circuit 58. The controller 62 can be configured to control power flow from the storage unit 46 to another electric load or system (not shown). When the controller 62 detects a predetermined current flowing within the service disconnect circuit 58, the controller 62 permits current to flow to the other electric load. When the controller 62 determines that the predetermined current is not flowing within the service disconnect circuit 58, the controller 62 can limit current flow between the storage unit 46 and the other electric load. In this way, the storage unit 46 can be electrically isolated from the electric load.

Figure 2:
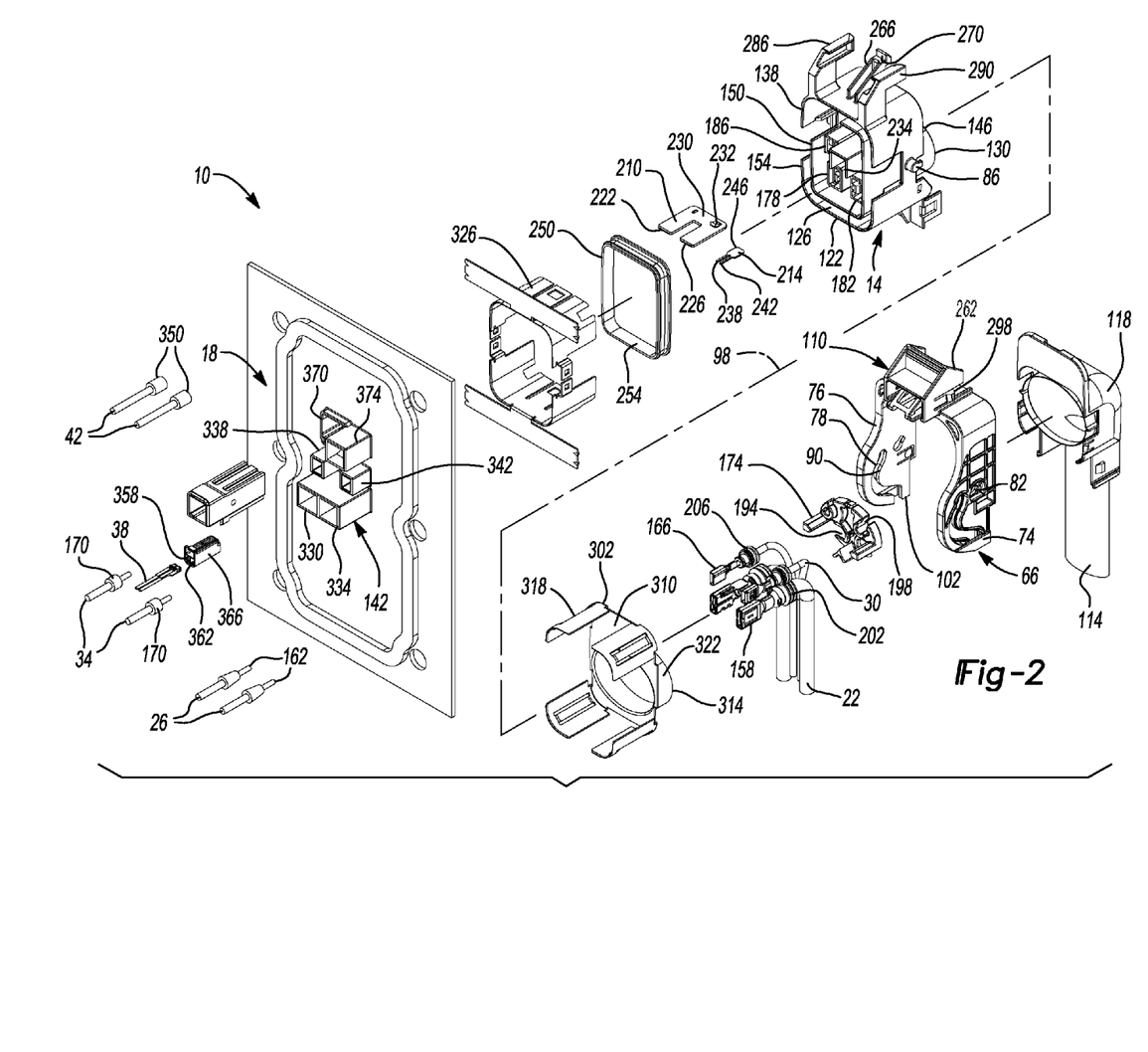
FIG. 2 is an exploded perspective view of the connector of FIG. 1.

With additional reference to FIG. 2, the connector 10 can further include a lever 66. The lever 66 can have an arm 70, a first lever body 74, and a second lever body 76. The first and second lever bodies 74 and 76 can be spaced apart and coupled by the arm 70 such that the first and second lever bodies 74 and 76 are configured to be located on opposite sides of the first body 122. At least one of the first and second lever bodies 74 and 76 can define a cam groove 78 and a pivot feature 82. The pivot feature 82 can be coupled for rotation about a pivot member 86 that is coupled to the first housing 14. In the present example, the pivot feature 82 is an aperture and the pivot member 86 is a protrusion extending from the first housing 14 into the aperture (pivot feature 82). However, other configurations that allow the lever 66 to rotate are contemplated, such as the pivot feature 82 being a protrusion extending into an aperture formed in the first housing 14 for example. The arm 70 extends from the lever body 74 and can be used to pivot the lever 66 about the pivot member 86. The cam groove 78 can have a cam surface 90 configured to slidingly engage a follower member 94 that is coupled to the second housing 18 and can be received in the cam groove 78. The cam surface 90 and the follower member 94 can cooperate to cause the first housing 14 and second housing 18 to move relative to each other along a mating axis 98 when the lever 66 is pivoted and the first and second housings 14, 18 are at least partially mated. The lever 66 can be pivoted between a first position, which is configured to permit assembly/disassembly of the first and second housings 14, 18 into/out of a preset condition, and a second position in which the first and second housings 14, 18 are in the fully mated condition. It will be appreciated that when the first and second housings 14, 18 are in the preset condition and the lever 66 is pivoted from the first position to the second position, the lever 66 can cause movement of first housing 14 relative to the second housing 18 that positions the first and second housings 14, 18 in the fully mated condition. Similarly, it will be appreciated that when the first and second housings 14, 18 are in the fully mated condition and the lever 66 is pivoted from the second position to the first position, the lever 66 can cause movement of the first housing 14 relative to the second housing 18 that positions the first and second housings 14, 18 in the preset condition. When the lever is in the first position, the first housing 14 is removable from the second housing 18. The lever 66 can include a slot 102 at a first end 106 of the cam groove 78 that allows the follower member 94 to be inserted into/removed from the cam groove 78. The lever 66 can also include a locking feature 110 to secure the first and second housings 14, 18 in the fully mated condition by securing the lever 66 in the second position.

The connector 10 is also shown with optional wire shielding 114 and an optional shroud 118. The wire shielding 114 can envelop the first and third wires 22, 30 and be configured to prevent current flowing in the first and third wires 22, 30 from interfering with other vehicle components and can prevent outside interference from interfering with the flow of current within the first and third wires 22, 30. For example, the wire shielding 114 can be electromagnetic compatibility ("EMC") shielding to limit electro-magnetic radiation from passing through the wire shielding 114. The shroud 118 can be mounted to the rear of the first housing 14, encapsulating the portions of the first and third wires 22, 30 proximal to the first housing 14 and extending therefrom between the shroud 118 and the first housing 14. The shroud 118 can act to route the first and third wires 22, 30 in a direction desired to fit the constraints of the vehicle and/or can protect the first and third wires 22, 30 and secure them within the first housing 14 and/or can provide strain relief for the first and third wires 22, 30. In the present example, the shroud 118 is configured to bend the first and third wires 22, 30 substantially ninety degrees to route the first and third wires 22, 30 substantially perpendicular to the mating axis 98.

Figure 3:
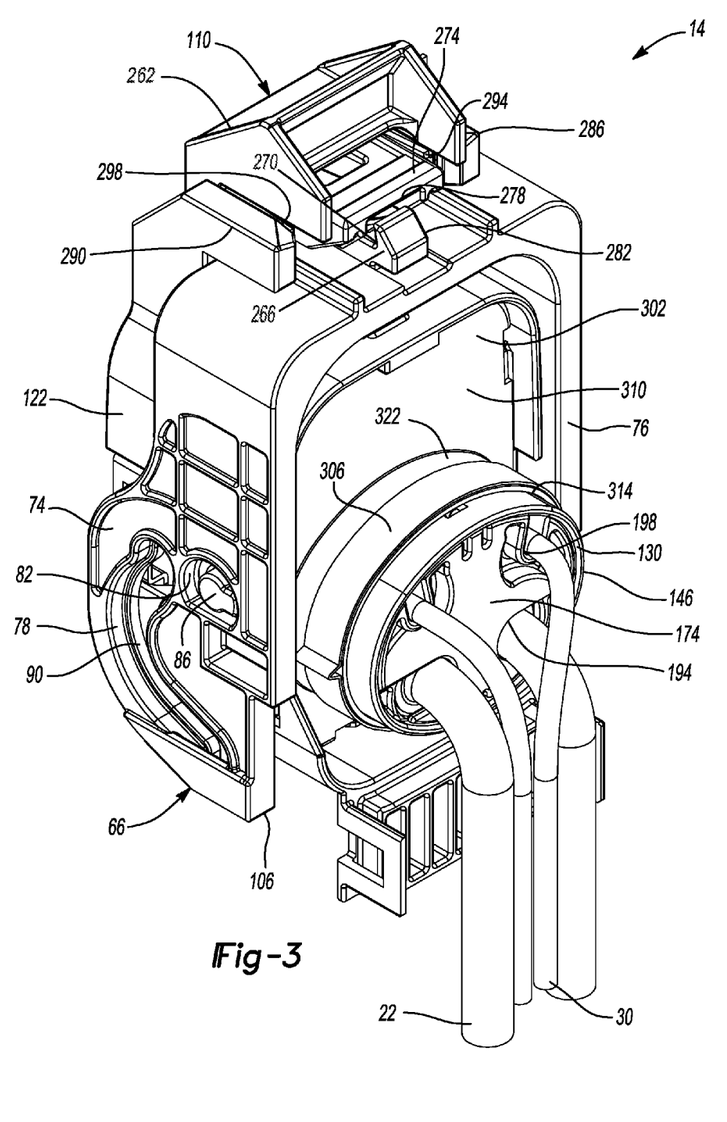
FIG. 3 is a rear perspective view of the first housing.

With reference to FIGS. 2 and 3, the first housing 14 can have a first body 122 that can define a cavity 126, an aperture 130 and a plurality of bays within the cavity 126 (the plurality of bays will be described in further detail below). The cavity 126 is open on a first side 138 of the first body 122 to allow the first body 122 to mate with a second body 142 of the second housing 18. The aperture 130 extends through a second side 146 of the first body 122 to allow the first and third wires 22, 30 to enter the cavity from the second side 146. The first body 122 can further define an inner wall 150 spaced apart from an outer wall 154, the outer wall 154 defining the periphery of the cavity 126, and extending from the second side 146 of the first body 122, into the cavity 126. The plurality of bays can extend from the second side 146 into the cavity 126 and can be arranged within the inner wall 150 and the cavity 126.

Figure 4:
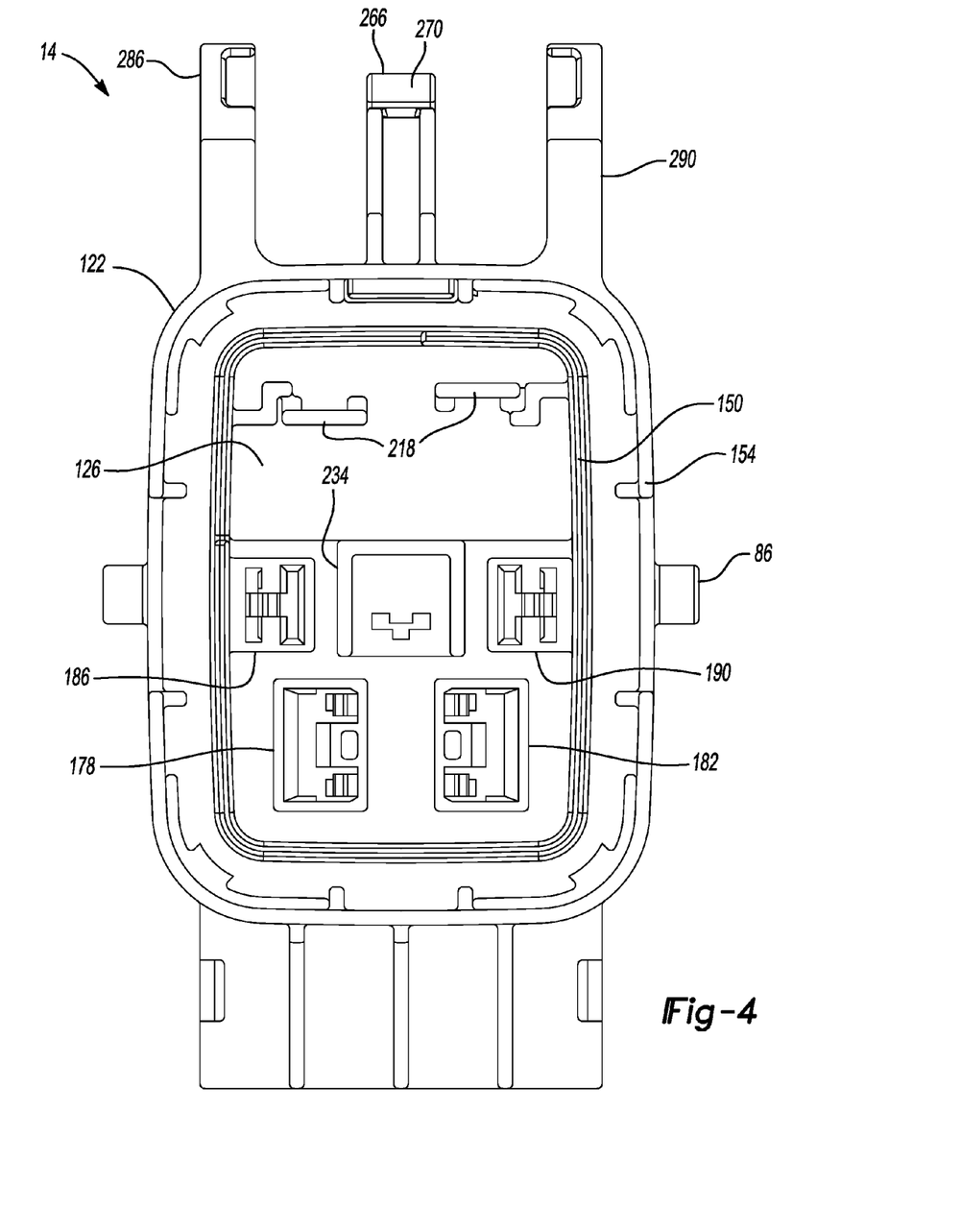
FIG. 4 is a front view of the first housing.
Figure 6:
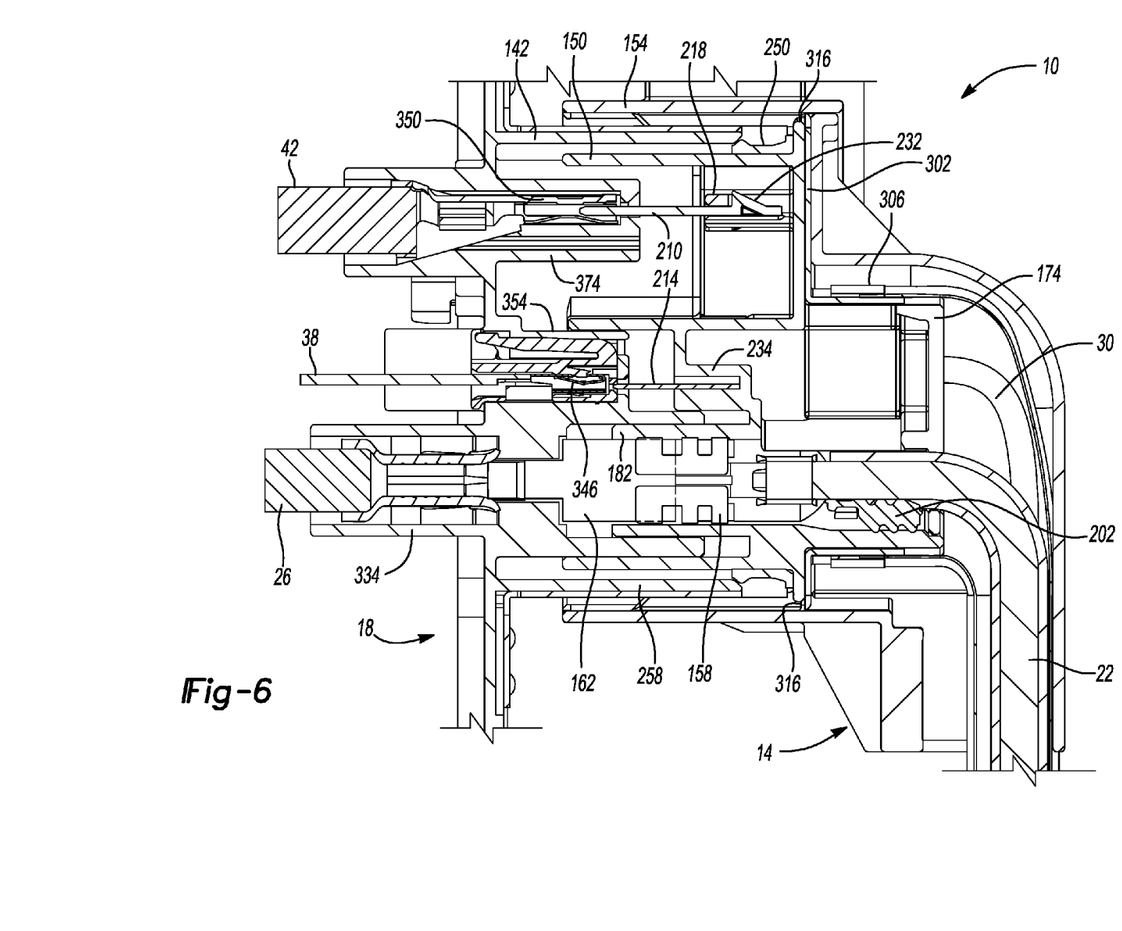
FIG. 6 is a section view of the connector taken along the line 6-6 in FIG. 5 and depicting the first housing partially unmated from the second housing.
Figure 7:
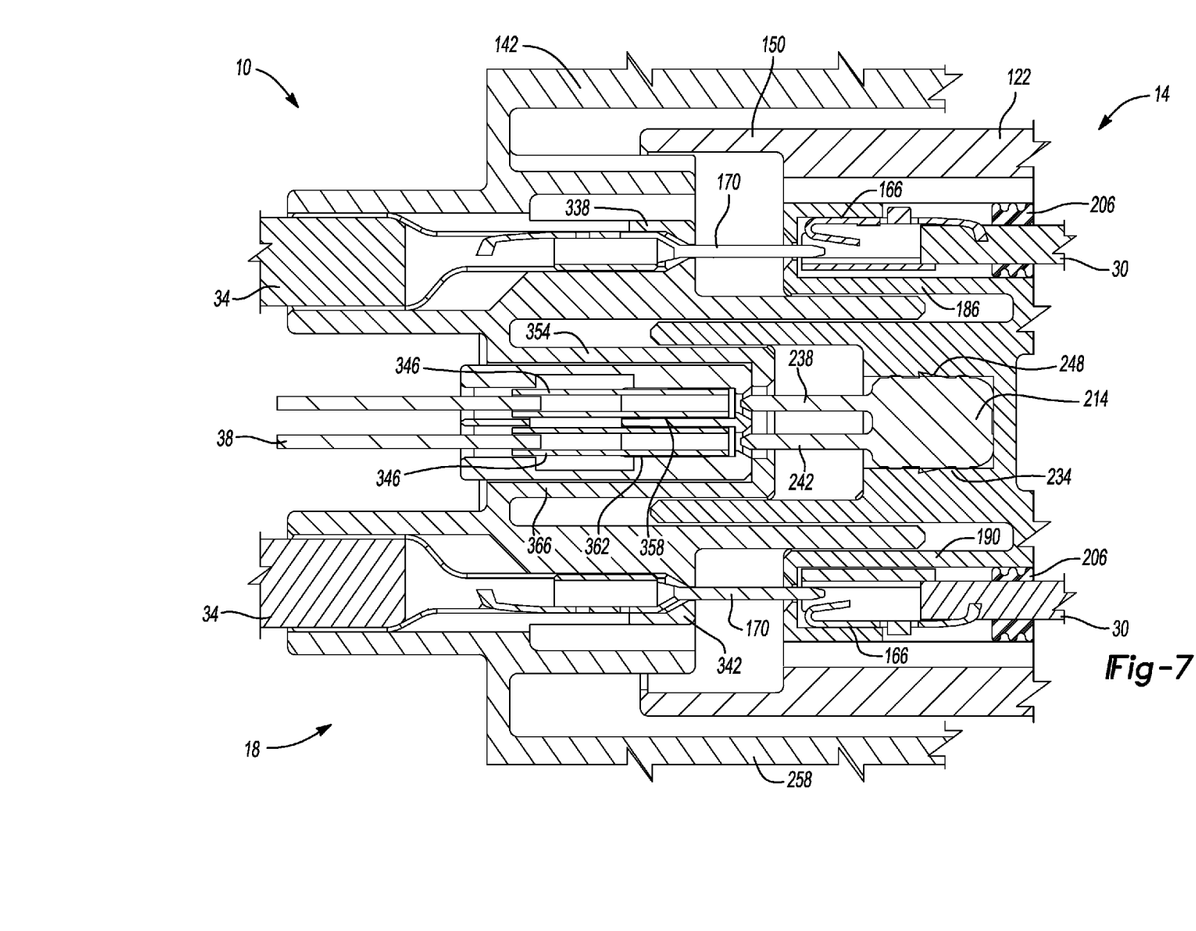
FIG. 7 is a section view of the connector taken along the line 7-7 in FIG. 5 and depicting the first housing partially unmated from the second housing.

With reference to FIGS. 2, 6 and 7, the connector 10 can further include a plurality of first terminals 158, each of which can be coupled to a corresponding one of the first wires 22, a plurality of second terminals 162, each of which can be coupled to a corresponding one of the second wires 26, a plurality of third terminals 166, each of which can be coupled to a corresponding one of the third wires 30, a plurality of fourth terminals 170, each of which can be coupled to a corresponding one of the fourth wires 34, and a rear holder 174. Each of the first terminals 158 can be located within a corresponding pair of first and second bays 178, 182 (best shown in FIG. 4) formed by the first housing 14 and each of the third terminals 166 can be located within a corresponding pair of third and fourth bays 186, 190 (best shown in FIG. 4) formed by the first housing 14. The rear holder 174 can include a pair of first apertures 194 and a pair of third apertures 198. Each of the first apertures 194 can receive a corresponding one of the first wires 22 therethrough, and each of the third apertures 198 can receive a corresponding one of the third wires 30 therethrough. The rear holder 174 can attach to the back of the first body 122 to secure the first terminals 158 in the first and second bays 178, 182 and the third terminals 166 within the third and fourth bays 186, 190. Wire seals 202 can be sealingly engaged to the first body 122 and the first wires 22, wire seals 206 can be sealingly engaged to the first body 122 and the third wires 30. The rear holder 174 can act to secure the wire seals 202, 206 within the first body 122. Other configurations of the rear holder 174 and wire seals 202, 206 are contemplated, including a single wire seal with apertures for each wire, for example.

Figure 5:
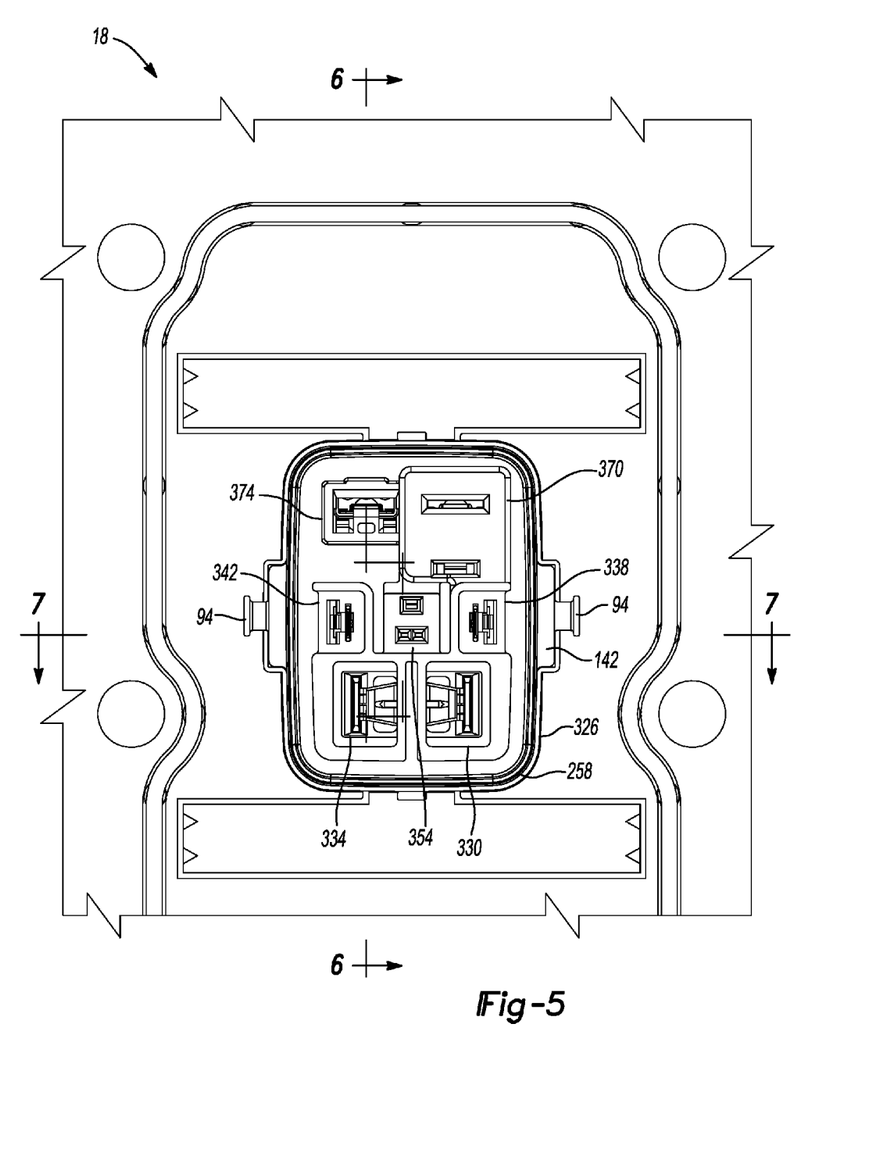
FIG. 5 is a front view of the second housing.

With reference to FIGS. 2 and 6, the connector 10 can further include a power shunt 210 and an HVIL shunt 214. The power shunt 210 can be generally U-shaped and can include a first leg 222, a second leg 226 and a bridge 230, which electrically couples the first and second legs 222 and 226. The power shunt 210 can be received in a fifth bay 218 (best shown if FIG. 5) formed in the first body 122. The first and second legs 222 and 226 can extend from the fifth bay 218 toward the first side 138. The power shunt 210 can be coupled to the first body 122 in any desired manner. For example, at least one locking tab 232 can be coupled to the bridge 230; the at least one locking tab 232 can abut the interior surface of bay 218 and can be secured therein, for example by a press fit. The power shunt 210 is formed from a conductive material to allow current to flow between the first and second legs 222, 226 with relatively little resistance. The HVIL shunt 214 can be located within a sixth bay 234 (best shown if FIG. 5) formed within the first body 122. The HVIL shunt 214 can have a third leg 238 and a fourth leg 242 and a second bridge 246 coupled therebetween. The third and fourth legs 238 and 242 can extend from the sixth bay 234 toward the first side 138. The HVIL shunt 214 can be coupled to the first body 122 in any desired manner. For example, at least one locking tab 248 (best shown in FIG. 7) can be coupled to the second bridge 246; the at least one locking tab 248 can abut the interior surface of bay 234 and can be secured therein, for example by a press fit. The HVIL shunt 214 is formed from a conductive material to allow current to flow between the third leg 238 and the fourth leg 242 with relatively little resistance.

The connector 10 can also include a seal 250 located between the first housing 14 and the second housing 18 to form a seal therebetween. The seal 250 can include an annular body 254 configured to be located within the cavity 126 and between the outer wall 154 and the inner wall 150 of the first body 122. The seal 250 can be configured to form a seal between the first body 122 and a wall 258 of the second body 142 when the wall 258 is inserted between the inner and outer walls 150, 154 of the first body 122 during mating of the connector 10 (see FIGS. 6 and 7). The seal can act to protect the plurality of bays within the cavity 126, and thus the terminals and connections therein, from outside debris or fluids.

The locking feature 110 can include a clasp body 262 disposed on the arm 70 of the lever 66. The clasp body 262 can interact with a finger 266 extending from the first body 122 to lock the lever 66 to the first body 122 when the lever 66 is in the second position. The finger 266 can include a shoulder 270 and the clasp body 262 can include a first locking member 274 having a mating shoulder 278. The shoulder 270 and mating shoulder 278 can be configured to cooperate to prevent the lever 66 from being moved from the second position toward the first position. A portion of the finger 266 or the clasp body 262, or both can be resilient and biased toward locking positions in which the shoulders 270, 278 prevent the lever 66 from moving from the second position toward the first position. Such resiliency allows the resilient portion to flex to allow the lever 66 to move from the first position to the second position, where the bias causes the shoulders 270, 278 to snap into the locking positions once the lever 66 reaches the second position. Likewise, the resiliency allows the resilient portion to be manually articulated by an operator to unlock the locking feature 110. One or both of the finger 266 and the first locking member 274 can include a ramp 282 to slidably cooperate with the other of the finger 266 and the first locking member 274 to aid in flexing the resilient portion of the finger 266 or clasp body 262. The present example also includes second and third fingers 286, 290 coupled to the first body 122 for engaging second and third locking members 294, 298 on the clasp body 262.

The first housing 14 can optionally include an EMC shielding insert 302 and a clamp 306. The insert 302 can be configured to limit electro-magnetic radiation from passing through the insert 302. The insert 302 can have a base 310, an annular member 314, and flanges 314. The flanges 314 can be configured to enter the cavity 126 through the second side 146 of the first housing 14 through apertures 316 in first body between the outer wall 154 and the inner wall 150. The apertures 316 can be outward of where the seal 250 forms a seal with between the inner wall 150 and the wall 258 of the second body 142. The clamp 306 can be configured to be crimped to an annular surface 322 on the annular member 314 to clamp the EMC wire shielding 114 to the insert 302. The second housing 18 can also include an optional EMC shielding insert 326 configured to extend along a portion of the outer surface of wall 258 and can be in contact with insert 302 during mating.

FIGS. 6 and 7 illustrate section views of the connector 10 in the preset condition during mating or disengagement of the first housing 14 with the second housing 18 when the lever 66 is in the first position. The second body 142 can define a plurality of bays configured to be opposite the plurality of bays defined by the first body 122. The second terminals 162 can be received within seventh and eighth bays 330, 334 formed in the second body 142 (best shown in FIG. 5) and be configured to mate with the first terminals 158. The fourth terminals 170 can be received within ninth and tenth bays 338, 342 formed in the second body 142 (best shown in FIG. 5) and be configured to mate with the third terminals 166. The connector 10 can further include a pair of fifth terminals 346, each of which being coupled to a corresponding one of the fifth wires 38, and a pair of sixth terminals 350, each of which being coupled to a corresponding one of the sixth wires 42. The fifth terminals 346 can be received within an eleventh bay 354 formed in the second body 142 (best shown in FIG. 5) and be configured to mate with the third and fourth legs 238, 242 of the HVIL shunt 214, effectively shorting the fifth terminals 346. In the example provided, the fifth terminals 346 are located within sub-bays 358, 362 within an insert 366, the insert 366 being located within the eleventh bay 354. However, it is understood that the fifth terminals 346 could be located in individual bays of the second body 142. The sixth terminals 350 can be located within twelfth and thirteenth bays 370, 374 formed in the second body 142 (best shown in FIG. 5) and can be configured to mate with the first and second legs 222, 226 of the power shunt 210, effectively shorting the sixth terminals 350.

When the lever 66 is in the first position and the first and second housings 14, 18 are in the preset condition, the third and fourth legs 238, 242 of the HVIL shunt 214 are disengaged from the fifth terminals 346, the first and second legs 222, 226 of the power shunt 210 are disengaged from the sixth terminals 350, the first and second terminals 158 and 162 are engaged to one another, and the third and fourth terminals 166, 170 are engaged to one another. During the mating of the first and second housings 14, 18, electrical connection between the various engaging terminals is coordinated or timed in such a manner as to require in sequence a) the electrical coupling of the first wires 22 with the second wires 26 and the electrical coupling of the third wires 30 with the fourth wires 34, and thereafter b) the electrical coupling sixth wires 42 with one another (via the power shunt 210), and thereafter c) the coupling of the fifth wires 38 with one another (via the HVIL shunt 214). The controller 62 controls the power storage unit 46 such that no electrical power is transmitted through the second and fourth wires 26 and 34 unless the HVIL circuit 54 is completed. Configuration in this manner completes or closes the HVIL circuit 54 only after the service disconnect circuit 58 is completed or closed, which occurs only after the first wires 22 are electrically coupled to the second wires 26 and the third wires 30 are electrically coupled to the fourth wires 34. Accordingly, electrical power cannot be transmitted between the first and second terminals 158, 162 or between the third and fourth terminals 166, 170 despite their electrical connection until the sixth terminals 350 are electrically engaged to the legs 222, 226 of the power shunt 210, and the fifth terminals 346 are engaged to the legs 238, 242 of the HVIL shunt 214, which is timed to occur after the electrical engagement of the sixth terminals 350 to the legs 222, 226 of the power shunt 210. In this configuration electrical arching does not occur during mating of the first and second housings 14, 18.

Likewise during disengagement of the first and second housings 14, 18, which occurs through rotation of the lever 66 from the second position to the first position, the HVIL circuit 54 is broken or interrupted prior to disengagement of a) the first terminals 158 from the second terminals 162, b) the third terminals 166 from the fourth terminals 170, and c) the sixth terminals 350 from the legs 222, 226 of the power shunt 210. Configuration in this manner causes the controller 62 to toggle the electrical power from the storage unit 46 off prior to the point at which the sixth terminals 350 disengage the legs 222, 226 of the power shunt 210, or the third terminals 166 disengage the fourth terminals 170, or the first terminals 158 disengage the second terminals 162 so that electrical arching does not occur when the first housing 14 is being unmated from the second housing 18. In this way, the service disconnect circuit 58 and the HVIL circuit 54 are both broken, or interrupted with a single operation of the lever 66 during disengagement of the connector 10, but prior to full disengagement of the first and second housings 14, 18. In the present example, the relative positions of the HVIL shunt 214 and the power shunt 210 allow for a third or intermediate position between the first and second positions. In the intermediate position, which is illustrated in FIGS. 6 and 7, the terminals 158, 162, 166, 170 and the power shunt 210 are connected, while the HVIL shunt 214 is disconnected. In this way, the HVIL shunt 214 is the last connection made during mating and the first connection broken during disengagement of the connector 10.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. An electrical connector comprising:
a first housing having a first body, the first body defining a cavity, the first housing is configured to mate with a second housing, the second housing being coupled to a power storage device;
a pair of first terminals disposed within the cavity and configured to mate with a pair of second terminals to transfer power between the power storage device and the first terminals, the second terminals being disposed within the second housing;
a pair of third terminals disposed within the cavity and configured to mate with a pair of fourth terminals to transfer power between the power storage device and the third terminals, the fourth terminals being disposed within the second housing;
a first shunt disposed within the first housing, the first shunt is configured to short a pair of fifth terminals to complete an interlock circuit, the fifth terminals being disposed within the second housing and connected to the interlock circuit, the interlock circuit preventing the transfer of power between the first and second terminals and between the third and fourth terminals when the first shunt is disconnected from the fifth terminals, while allowing transfer of power when the first shunt mates with the fifth terminals; and
a second shunt disposed within the first housing, the second shunt is configured to short a pair of sixth terminals to complete a service disconnect circuit, the sixth terminals being disposed within the second housing and connected to the service disconnect circuit, the service disconnect circuit causing the power storage device to be electrically isolated when the second shunt is disconnected from the sixth terminals;
wherein the first shunt is positioned to engage the fifth terminals after the first and third pairs of terminals mate with the second and fourth pairs of terminals, and the first shunt disengages the fifth terminals before the first and third pairs of terminals disengage with the second and fourth pairs of terminals.

2. The electrical connector of claim 1, wherein the second shunt is positioned to engage the sixth terminals before the first shunt engages the fifth terminals, and the second shunt disengages the sixth terminals after the first shunt disengages the fifth terminals.

3. The electrical connector of claim 1, further comprising a lever having a lever body rotatably coupled to the first housing, and an arm coupled to the lever body, the lever body including a cam surface configured to engage a follower member on the second housing, the arm configured to articulate the cam surface to move the first housing relative to the second housing.

4. The electrical connector of claim 3, wherein the lever moves the first housing between first, second, and third positions relative to the second housing, wherein in the first position the first and second pairs of terminals are mated and neither of the first and second shunts are mated, in the second position the first and second pairs of terminals, the second shunt, and not the first shunt are mated, and in the third position the first and second pairs of terminals and both the first and second shunts are mated.

5. The electrical connector of claim 3, wherein the first housing includes a locking member and the lever includes a second locking member, the first and second locking members configured to cooperate to selectively prevent the lever from moving from the third position to the second position.

6. The electrical connector of claim 1, further comprising a sealing member disposed within the cavity, the sealing member is configured to form a seal between the first housing and the second housing to seal the terminals and shunts therein.

7. The electrical connector of claim 1, further comprising a wire seal, the wire seal configured to form a seal between at least one wire and the first housing, the at least one wire being connected to at least one of the terminals in the first and third pairs of terminals.

8. The electrical connector of claim 7, further comprising a rear holder, the rear holder coupled to the first housing and defining at least one orifice, the at least one orifice being configured to allow the at least one wire to extend through the rear holder while retaining the wire seal between the rear holder and the first housing.

9. The electrical connector of claim 1, further comprising an electromagnetic shield within the cavity.

10. An electrical connector comprising:
a first housing having a first body, the first body defining a cavity, the first housing is configured to mate with a second housing, the second housing being coupled to a power storage device;
a pair of first terminals disposed within the cavity and configured to mate with a pair of second terminals to transfer power between the power storage device and the first terminals, the second terminals being disposed within the second housing;
a pair of third terminals disposed within the cavity and configured to mate with a pair of fourth terminals to transfer power between the power storage device and the third terminals, the fourth terminals being disposed within the second housing;
a first shunt disposed within the cavity, the first shunt is configured to short a pair of fifth terminals to complete an interlock circuit, the fifth terminals being disposed within the second housing and connected to the interlock circuit, the interlock circuit preventing the transfer of power between the first and second terminals and between the third and fourth terminals when the first shunt is disconnected from the fifth terminals, while allowing transfer of power when the first shunt mates with the fifth terminals; and
a second shunt disposed within the cavity, the second shunt is configured to short a pair of sixth terminals to complete a service disconnect circuit, the sixth terminals being disposed within the second housing and connected to the service disconnect circuit, the service disconnect circuit causing the power storage device to be electrically isolated when the second shunt is disconnected from the sixth terminals; and
a lever having a lever body rotatably coupled to the first housing, and an arm coupled to the lever body, the lever body including a cam surface configured to engage a follower member on the second housing, the arm configured to articulate the cam surface to move the first housing relative to the second housing;
wherein the lever moves the first housing between first, second, and third positions relative to the second housing, wherein in the first position the first and second pairs of terminals are mated and neither of the first and second shunts are mated, in the second position the first and second pairs of terminals, the second shunt, and not the first shunt are mated, and in the third position the first and second pairs of terminals and both the first and second shunts are mated.

11. The electrical connector of claim 10, wherein the first housing includes a locking member and the lever includes a second locking member, the first and second locking members configured to cooperate to selectively prevent the lever from moving from the third position to the second position.

12. The electrical connector of claim 10, wherein the first shunt is positioned to engage the fifth terminals after the first and third pairs of terminals mate with the second and fourth pairs of terminals, and the first shunt disengages the fifth terminals before the first and third pairs of terminals disengage with the second and fourth pairs of terminals.

13. The electrical connector of claim 12, wherein the second shunt is positioned to engage the sixth terminals before the first shunt engages the fifth terminals, and the second shunt disengages the sixth terminals after the first shunt disengages the fifth terminals.

14. The electrical connector of claim 10, further comprising a sealing member disposed within the cavity, the sealing member is configured to form a seal between the first housing and the second housing to seal the terminals and shunts therein.

15. The electrical connector of claim 10, further comprising a wire seal, the wire seal configured to form a seal between at least one wire and the first housing, the at least one wire being connected to at least one of the terminals in the first and third pairs of terminals.

16. The electrical connector of claim 15, further comprising a rear holder, the rear holder coupled to the first housing and defining at least one orifice, the at least one orifice being configured to allow the at least one wire to extend through the rear holder while retaining the wire seal between the rear holder and the first housing.

17. The electrical connector of claim 10, further comprising an electromagnetic shield within the cavity.

18. An electrical connector comprising:
a first housing having a first body, the first body defining a cavity, the first housing is configured to mate with a second housing, the second housing being coupled to a power storage device;
a pair of first terminals disposed within the cavity and configured to mate with a pair of second terminals to transfer power between the power storage device and the first terminals, the second terminals being disposed within the second housing;
a pair of third terminals disposed within the cavity and configured to mate with a pair of fourth terminals to transfer power between the power storage device and the third terminals, the fourth terminals being disposed within the second housing;
a first shunt disposed within the first housing, the first shunt is configured to short a pair of fifth terminals to complete an interlock circuit, the fifth terminals being disposed within the second housing and connected to the interlock circuit, the interlock circuit preventing the transfer of power between the first and second terminals and between the third and fourth terminals when the first shunt is disconnected from the fifth terminals, while allowing transfer of power when the first shunt mates with the fifth terminals;
a second shunt disposed within the first housing, the second shunt is configured to short a pair of sixth terminals to complete a service disconnect circuit, the sixth terminals being disposed within the second housing and connected to the service disconnect circuit, the service disconnect circuit causing the power storage device to be electrically isolated when the second shunt is disconnected from the sixth terminals; and
a lever having a lever body rotatably coupled to the first housing, and an arm coupled to the lever body, the lever body including a cam surface configured to engage a follower member on the second housing, the arm configured to articulate the cam surface to move the first housing relative to the second housing.

19. The electrical connector of claim 18, wherein the lever moves the first housing between first, second, and third positions relative to the second housing, wherein in the first position the first and second pairs of terminals are mated and neither of the first and second shunts are mated, in the second position the first and second pairs of terminals, the second shunt, and not the first shunt are mated, and in the third position the first and second pairs of terminals and both the first and second shunts are mated.

* * * * *